Patented July 24, 1951

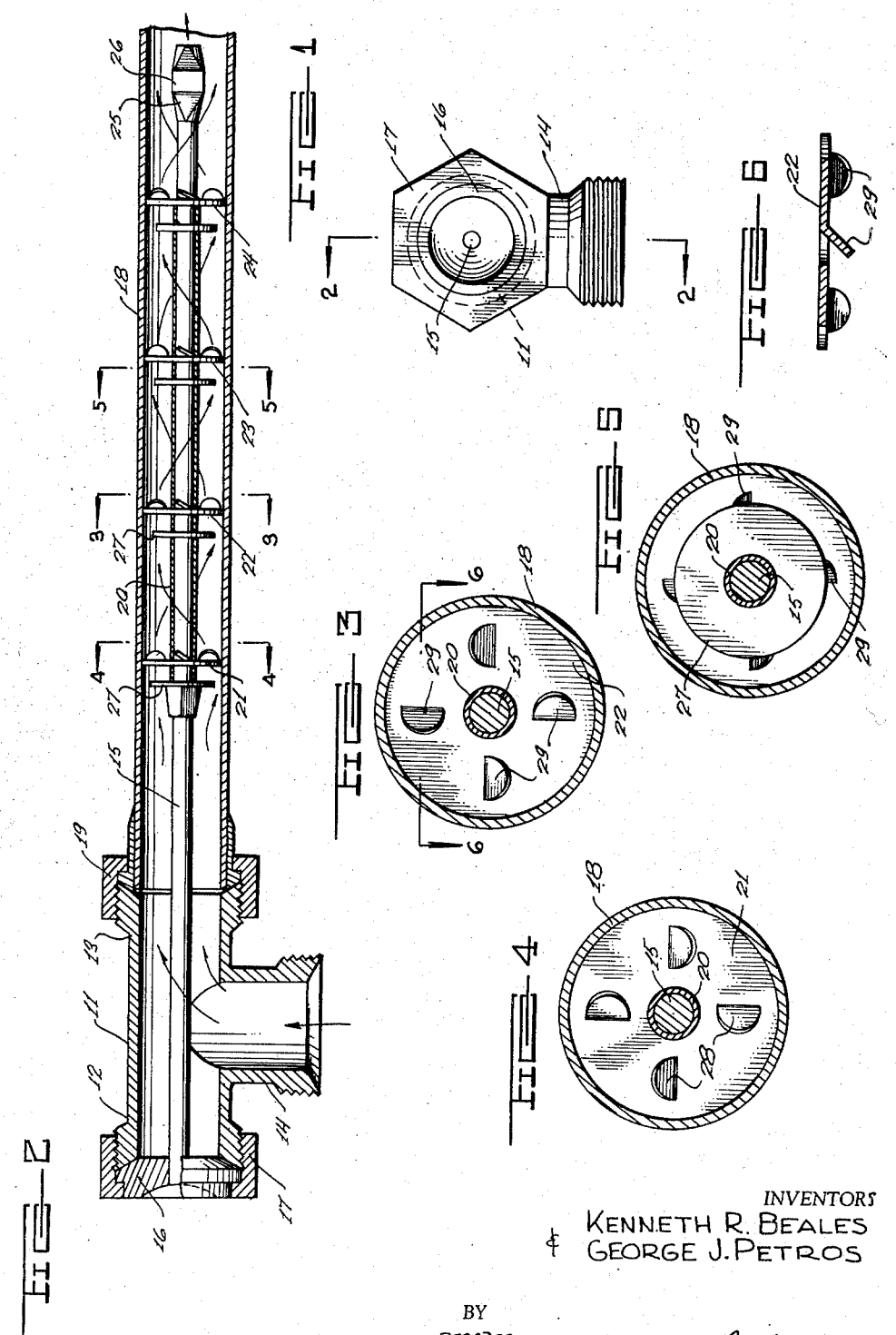

2,561,457

UNITED STATES PATENT OFFICE 2,561,457

MULTIDISK RIBBON JET

Kenneth R. Beales and George J. Petros, Irvington, Nebr.

Application February 3, 1950, Serial No. 142,164

5 Claims. (Cl. 107—1)

This invention relates to mixing apparatus, and more particularly to a device for mixing flavoring material with ice cream.

A main object of the invention is to provide a novel and improved mixing device for use in the outlet line of an ice cream freezer, the device being employed to mix a ribbon of flavoring material with the ice cream after it leaves the freezer, giving the ice cream a marbled appearance, said device being simple in construction, being easy to install, and providing a thorough distribution of the flavoring material in the ice cream.

A further object of the invention is to provide an improved device for mixing flavoring or coloring material in ice cream after it leaves the freezer, said device involving only a few parts, providing a smooth and even distribution of the flavor ribbon throughout the ice cream, whereby the flavoring material will not settle or run out of the packaged ice cream, the device involving no moving parts.

Further objects and advantages of the invention will become apparent from the following description and claims, and from the accompanying drawings, wherein:

Figure 1 is an end elevational view of a portion of the outlet line of an ice cream freezer, showing a mixing device according to the present invention installed therein;

Figure 2 is a longitudinal cross-sectional view taken on line 2—2 of Figure 1;

Figure 3 is a transverse cross-sectional view taken on line 3—3 of Figure 2;

Figure 4 is an enlarged transverse cross-sectional view taken on line 4—4 of Figure 2;

Figure 5 is an enlarged cross-sectional view taken on line 5—5 of Figure 2;

Figure 6 is a cross-sectional detail view taken on line 6—6 of Figure 3.

Referring to the drawings, 11 designates a T-fitting having the branches 12, 13 and 14. Designated at 15 is an elongated rod secured at one end to a head member 16 which is fitted into the mouth of the branch 12 of the T-fitting and is secured thereto by a flanged nut 17. Designated at 18 is a portion of the outlet line of the ice cream freezer, said portion being connected to the mouth of the branch 13 of the T-fitting by a flanged coupling nut 19, as shown in Figure 2. The rod 15 extends axially into the conduit 18 and has secured thereto a sleeve 20. Secured to the sleeve 20 are spaced discs 21, 22, 23 and 24 which fit within the conduit 18 and support the sleeve 20 and rod 15 in axial position in the conduit 18. Secured to the end of the rod 15 is a tip 25 which has an enlarged cross-sectional size at its intermediate portion, as shown at 26, the end portions of said tip being tapered, as shown. Secured to the sleeve 20 forwardly adjacent to and spaced from the respective discs 21 to 24 are discs 27 of reduced size, as compared with the discs 21 to 24, said discs 27 defining annular spaces forwardly adjacent the discs 21 to 24 through which the ice cream may pass. The discs 21 and 23 are formed with inclined, up-struck tabs 28 which project clockwise, as shown in Figure 4. The discs 22 and 24 are formed with similar up-struck, inclined tabs 29 which extend counterclockwise, as viewed in Figure 3.

In operation, the flavoring material is pumped into the ice cream line ahead of the T-fitting 11, namely, into the line which is connected with the branch 14. When the ice cream and flavoring material reach the discs 27, 21, the material is extruded in an annular shape and then passes through the apertures defined by the up-struck tabs 28, the flow of material being deflected in a helical fashion by passage through the apertures defined by tabs 28. When the material reaches the next disc 27 and flows around said disc into engagement with the disc 22, the material is forced through the apertures defined by the up-struck tabs 29 of disc 22 and its flow is deflected in a helical fashion reversed with respect to the first deflection thereof produced by the disc 21. Similarly, the helical flow of the material is reversed when the material is passed through the disc 23 and is again reversed when said material passes through the disc 24. The material resumes longitudinal flow when it passes through the space defined around the intermediate portion 26 of the tip 25, said intermediate portion being preferably square in cross-section, the material then flowing through the line 18 in the normal manner. By the action above described, the colored flavoring material is thoroughly distributed throughout the ice cream, whereby the ice cream is provided with a marbled appearance and whereby the flavoring material will not settle or run out of the ice cream when it is packaged.

The device may be readily removed for cleaning by unfastening the nut 17 and withdrawing the device from the conduit 18 and the fitting 11.

While a specific embodiment of a mixing device for ribboning flavoring material into ice cream has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A mixing device comprising a tubular member for fluid material to be mixed, a rod member in said tubular member, a plurality of disc elements secured in spaced relation on said rod member, said disc elements closely fitting within the tubular member, each disc element being formed with a plurality of up-struck inclined tabs, the tabs being located on the discharge sides of said disc elements, said tabs defining apertures in said disc elements, the tabs of adjacent disc elements extending in opposite directions around the axis of the rod member, and respective smaller additional disc elements secured on the rod member forwardly adjacent to said first-mentioned disc elements.

2. A mixing device comprising a tubular member for fluid material to be mixed, a rod member in said tubular member, a plurality of disc elements secured in spaced relation on said rod member, said disc elements closely fitting within the tubular member, each disc element being formed with a plurality of up-struck inclined tabs, the tabs being located on the discharge sides of the disc elements, said tabs defining apertures in the disc elements, the tabs of adjacent disc elements extending in opposite directions around the axis of the rod member, respective smaller additional disc elements secured on the rod member forwardly adjacent said first-mentioned disc elements, and a tip secured on the forward end of said rod member, said tip being enlarged at its mid-portion and being tapered at its end portions.

3. A mixing device comprising a tubular member for fluid material to be mixed, a T-fitting, a head element secured in one of the top branches of said T-fitting, the other top branch being connected to the tubular member, a rod member secured to said head element and extending axially through the top branches of said T-fitting, said rod member being arranged to extend axially into the portion of the tubular member connected to the other top branch of said T-fitting, a plurality of disc elements secured in spaced relation on said rod member, said disc elements closely fitting within said tubular member, each disc element being formed with a plurality of up-struck inclined tabs, the tabs being located on the discharge sides of said disc elements, said tabs defining apertures in said disc elements, the tabs of adjacent disc elements extending in opposite directions around the axis of the rod member, respective smaller additional disc elements secured on the rod member forwardly adjacent to said first-mentioned disc elements, said smaller disc elements defining annular passages with respect to the wall of the tubular member, and a tip secured on the forward end of said rod member, said tip being enlarged at its mid-portion and being tapered at its end portions.

4. A mixing device comprising a tubular member for fluid material to be mixed, a rod member, a plurality of disc elements secured in spaced relation on said rod member, said disc elements closely fitting within the tubular member, each disc element being formed with a plurality of apertures and carrying inclined vane elements, the vane elements being located on the discharge sides of said disc elements, the vane elements of adjacent disc elements extending in opposite directions around the axis of the rod member, respective smaller additional disc elements secured on the rod member forwardly adjacent to said first-mentioned disc elements, and a tip secured on the forward end of said rod member, said tip being enlarged at its mid-portion and being tapered at its end portions.

5. A mixing device comprising a tubular member for fluid materials to be mixed, a rod member, a plurality of disc elements secured in longitudinally spaced relation on said rod member, said disc elements closely fitting within the tubular member, each disc element being formed with a plurality of apertures, inclined vane elements on the disc elements, the vane elements being located on the discharge sides of said disc elements, the vane elements of adjacent disc elements extending in opposite directions around the axis of the rod member, respective means located forwardly adjacent to said disc elements defining restricted passages with respect to the tubular member forwardly of said disc elements, and a tapered tip secured on the forward end of said rod member.

KENNETH R. BEALES.
GEORGE J. PETROS.

REFERENCES CITED

The following references are of record in the file of this patent:

UNITED STATES PATENTS

| Number | Name | Date |
|---|---|---|
| 1,078,848 | Gray et al. | Nov. 18, 1913 |
| 1,083,275 | Eberhard | Jan. 6, 1914 |
| 1,689,446 | Miller et al. | Oct. 30, 1928 |
| 2,193,001 | Ish-Shalom | Mar. 12, 1940 |
| 2,239,165 | Adams | Apr. 22, 1941 |